US011640300B2

(12) United States Patent
Liu et al.

(10) Patent No.: US 11,640,300 B2
(45) Date of Patent: May 2, 2023

(54) BYTE COMPARISON METHOD FOR STRING PROCESSING AND INSTRUCTION PROCESSING APPARATUS

(71) Applicant: ALIBABA GROUP HOLDING LIMITED, Grand Cayman (KY)

(72) Inventors: Chang Liu, Shanghai (CN); Xianmiao Qu, Hangzhou (CN); Lifang Xia, Hangzhou (CN); Feng Zhu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 29 days.

(21) Appl. No.: 17/022,487

(22) Filed: Sep. 16, 2020

(65) Prior Publication Data

US 2021/0089309 A1 Mar. 25, 2021

(30) Foreign Application Priority Data

Sep. 24, 2019 (CN) .......................... 201910903753.6

(51) Int. Cl.
*G06F 9/30* (2018.01)

(52) U.S. Cl.
CPC ...... *G06F 9/30196* (2013.01); *G06F 9/30021* (2013.01); *G06F 9/30094* (2013.01); *G06F 9/30134* (2013.01)

(58) Field of Classification Search
CPC ............. G06F 9/30196; G06F 9/30021; G06F 9/30134; G06F 9/30094
See application file for complete search history.

(56) References Cited

U.S. PATENT DOCUMENTS

| 7,962,728 | B2 * | 6/2011 | Arakawa | G06F 9/381 |
| | | | | 712/220 |
| 9,009,447 | B2 * | 4/2015 | Gove | G06F 9/30036 |
| | | | | 712/7 |
| 10,929,131 | B2 * | 2/2021 | Julier | G06F 9/30029 |
| 2005/0004901 | A1 * | 1/2005 | Mizobata | H04N 21/434 |
| 2008/0077773 | A1 * | 3/2008 | Julier | G06F 9/30192 |
| | | | | 712/210 |
| 2013/0246739 | A1 * | 9/2013 | Bradbury | G06F 9/30018 |
| | | | | 712/204 |
| 2018/0052689 | A1 * | 2/2018 | Julier | G06F 12/0875 |
| 2020/0265097 | A1 * | 8/2020 | Lichtenau | G06F 40/205 |
| 2021/0072990 | A1 * | 3/2021 | Figuli | G06F 9/30036 |

OTHER PUBLICATIONS

International Search Report and written opinion in related International Application No. PCT/US20/50999, dated Dec. 22, 2020 (9 pgs.).

* cited by examiner

*Primary Examiner* — Corey S Faherty
(74) *Attorney, Agent, or Firm* — Finnegan, Henderson, Farabow, Garrett & Dunner, LLP

(57) ABSTRACT

Embodiments of the present disclosure provide an instruction processing apparatus, comprising a first register configured to store a source string, wherein the source string comprises at least one byte, and an execution circuitry, communicatively coupled to the first register and configured to execute a comparison instruction to compare the at least one byte in the source string with an ending identifier to obtain a result value corresponding to the source string, wherein the comparison instruction is executed on each of the at least one byte in the source string and the comparison instruction is an assembly code instruction.

17 Claims, 11 Drawing Sheets

```
tstnbz rd,rs rd[63:56] = (rs[63:56] != 0) ? 8'h0 : 8'hff
rd[55:48] = (rs[55:48] != 0) ? 8'h0 : 8'hff
rd[47:40] = (rs[47:40] != 0) ? 8'h0 : 8'hff
rd[39:32] = (rs[39:32] != 0) ? 8'h0 : 8'hff
rd[31:24] = (rs[31:24] != 0) ? 8'h0 : 8'hff
rd[23:16] = (rs[23:16] != 0) ? 8'h0 : 8'hff
rd[15: 8 ] = (rs[ 15:8 ] != 0) ? 8'h0 : 8'hff
rd[ 7 : 0 ] = (rs[ 7: 0 ] != 0) ? 8'h0 : 8'hff
```

FIG. 4

```
tstnbz rs clr zf
rd[63:56] = (rs[63:56] == 0) ? stc zf
rd[55:48] = (rs[55:48] == 0) ? stc zf
rd[47:40] = (rs[47:40] == 0) ? stc zf
rd[39:32] = (rs[39:32] == 0) ? stc zf
rd[31:24] = (rs[31:24] == 0) ? stc zf
rd[23:16] = (rs[23:16] == 0) ? stc zf
rd[15: 8 ] = (rs[ 15:8 ] == 0) ? stc zf
rd[ 7 : 0 ] = (rs[ 7: 0 ] == 0) ? stc zf
```

FIG. 6

```
<strcmp>
or      a4, a0, a1 //OR instruction:
andi    a4, a4, 7 //bit AND instruction
bnez    a4,6e <.Lmismatch> //conditional branch instruction
<Lloop>
ld      a2, 0 (a0) //load instruction
ld      a3, 0 (a1) //load instruction
tstnbz  t0, a2 //byte comparison instruction
xor     t1, a2, a3 //XOR instruction
or      t2, t0, t1 //OR instruction:
bnez    t2,4c <.Lmismatch> //conditional branch instruction
ld      a2, 8 (a0) //load instruction
ld      a3, 8 (a1) //load instruction
tstnbz  t0, a2 //byte comparison instruction
xor     t1, a2, a3 //XOR instruction
or      t2, t0, t1 //OR instruction
bnez    t2,4c <.Lmismatch> //conditional branch instruction
ld      a2, 16 (a0) //load instruction
ld      a3, 16 (a1) //load instruction
tstnbz  t0, a2 //byte comparison instruction
xor     t1, a2, a3 //XOR instruction
or      t2, t0, t1 //OR instruction
bnez    t2,4c <.Lmismatch> //conditional branch instruction
addi    a0, a0, 24 //bit AND instruction
addi    a1, a1, 24 //bit AND instruction
j       a <.Lloop> //unconditional jump instruction
<Lmismatch>
//use a subtraction instruction to determine a size relationship between data in a
first general-purpose register and data in a second general-purpose register
rev     t1, t2
ffl     t0, t1
andi    t0, t0, 248 //bit AND instruction
srl     t1, a2, t0 //right shift instruction
andi    t1, t1, 255 //bit AND instruction
srl     t2, a3, t0 //right shift instruction
andi    t2, t2, 255 //bit AND instruction
sub     a0, t1, t2 // Subtract instruction: execute t1-t2, write a0
ret                // Return from the sub-process.
```

BYTE COMPARISON METHOD FOR STRING PROCESSING AND INSTRUCTION PROCESSING APPARATUS

CROSS REFERENCE TO RELATED APPLICATION

This disclosure claims the benefits of priority to Chinese application number 201910903753.6, filed Sep. 24, 2019, which is incorporated herein by reference in its entirety.

TECHNICAL FIELD

The present disclosure relates to the technical field of processors, and more particularly, to methods and systems for string processing and an instruction processing apparatus.

BACKGROUND

Currently, mainstream architectures of processors include an ×86 architecture, an ARM architecture, and a microprocess without interlocked pipelined stages ("MIPS") architecture. With the development of reduced instruction set ("RISC"), a new processor architecture is expected to be developed based on the fifth generation RISC ("RISC-V"). The RISC-V is an open instruction set architecture ("ISA") established based on a RISC principle. The architecture has advantages of being completely open source, having a simple architecture, and having modular designs. In addition, the architecture makes hardware implementation simple, so that the development cycle and cost of processor chips can be reduced. The RISC-V architecture may support 32-bit or 64-bit register width, so that performance requirements of multiple application scenarios can be taken into consideration.

SUMMARY

Embodiments of the present disclosure provide an apparatus, comprising: a first register configured to store a source string, wherein the source string comprises at least one byte, and an execution circuitry, communicatively coupled to the first register and configured to execute a comparison instruction to compare the at least one byte in the source string with an ending identifier to obtain a result value corresponding to the source string, wherein the comparison instruction is executed on each of the at least one byte in the source string and the comparison instruction is an assembly code instruction.

Embodiments of the present disclosure further provide a method for string processing, comprising: acquiring a source string; comparing the source string with an ending identifier using an comparison instruction, wherein the comparison instruction comprises comparing each byte of the source string with the ending identifier and the comparison instruction is an assembly code instruction; and obtaining a result value corresponding to the source string according to a result of the comparison.

Embodiments of the present disclosure further provide a string comparison method, comprising: loading corresponding contents respectively from a first string and a second string according to a register bit width; executing a comparison instruction to generate a corresponding first result value by using the content of the first string as the source string and to determine whether the content of the first string includes an ending identifier according to the first result value, wherein the comparison instruction an assembly code instruction; and in response to a determination that the content of the first string not including the ending identifier, performing size comparison on the content of the first string and the content of the second string.

Embodiments of the present disclosure further provide a computer system, comprising: a memory; and a processor communicatively coupled to the memory, the processor comprising: a first register configured to store a source string, wherein the source string comprises at least one byte; and an execution circuitry communicatively coupled to the first register and configured to acquire the source string from the first register; and execute a comparison instruction to compare the at least one byte in the source string with an ending identifier to obtain a result value corresponding to the source string, wherein the comparison instruction is executed on each of the at least one byte in the source string and the comparison instruction is an assembly code instruction.

BRIEF DESCRIPTION OF THE DRAWINGS

FIG. 4 shows an example pseudocode of a byte comparison instruction tstnbz, according to some embodiments of the present disclosure.

FIG. 6 shows an example pseudocode of a byte comparison instruction tstnbz with flag register zf, according to some embodiments of the present disclosure.

FIG. 8 shows an example pseudocode of a string comparison function strcmp, according to some embodiments of the present disclosure.

DETAILED DESCRIPTION

Figure 1:
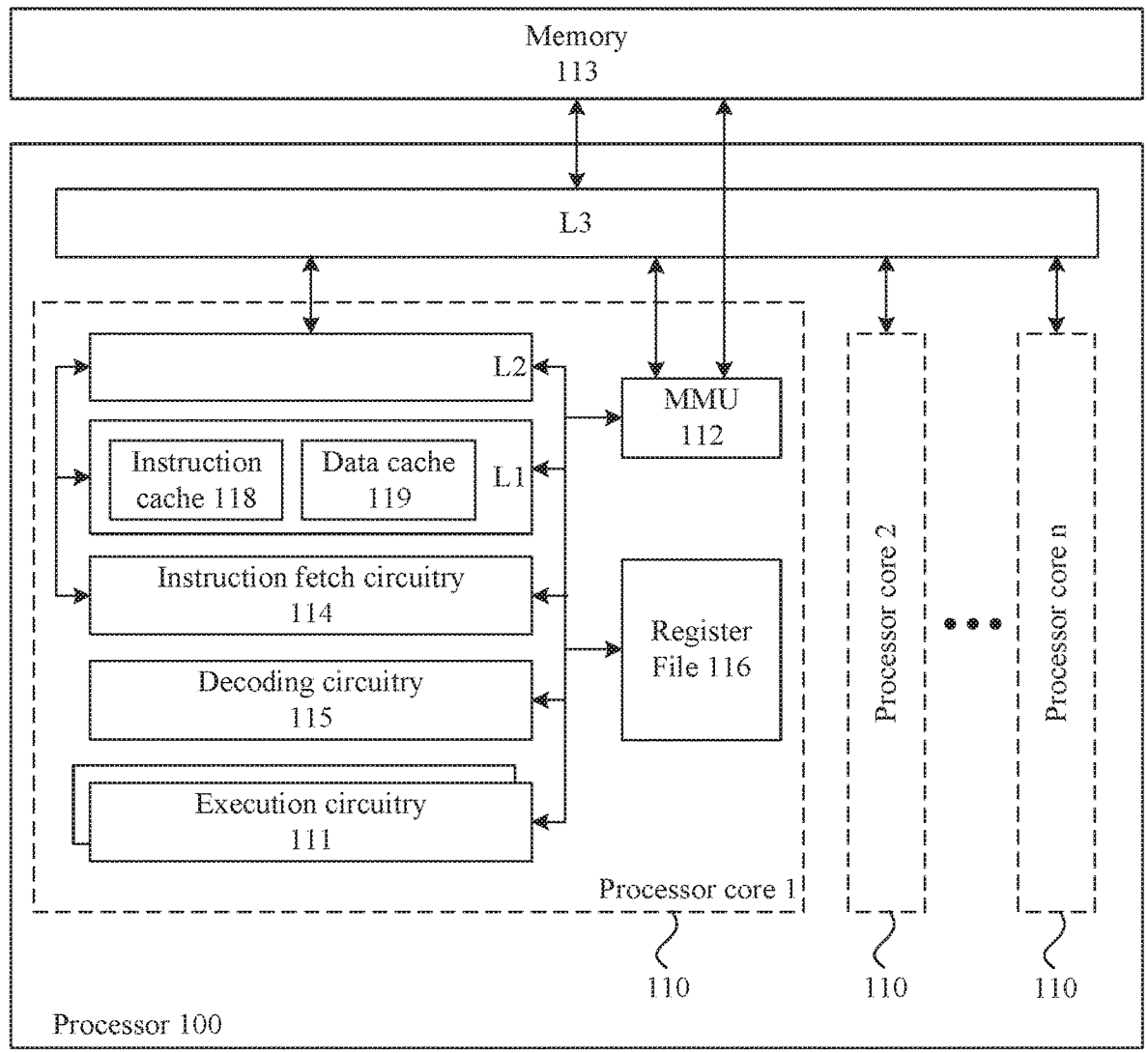
FIG. 1 shows an example schematic of a processor, according to some embodiments of the present disclosure.

To make the objectives, technical solutions and advantages of the embodiments of the present disclosure clearer, the technical solutions in the embodiments of the present disclosure are described below with reference to the accompanying drawings in the embodiments of the present disclosure. The described embodiments are merely some rather than all of the embodiments of the present disclosure. Based on the embodiments in the present disclosure, all other embodiments obtained by those with ordinary skill in the art without creative efforts should fall within the protective scope of the present disclosure.

As processors are used in the field of artificial intelligence ("AI"), the natural language processing capability of processors is becoming increasingly important. To analyze text content of a natural language and translate into an understandable meaning for the processor, processors perform grammatical analysis and word segmentation on the text content, which involves the function of implementing a string comparison instruction in the processors. If an extended instruction set, such as byte comparison instructions, is used in the processor architecture, the word processing capability of the processor can be significantly improved, providing advantages in increasing the processing efficiency and speed of text retrieval and natural language processing.

In the existing ARM architecture and MIPS architecture, an assembly instruction sequence for determining whether strings end and whether the strings are equal in a string comparison operation includes a plurality of standard instructions mov/sub/orr/bic instruction in the ARM architecture). The existing processor architectures execute standard instructions suitable for string processing, but do not provide high-performance dedicated instructions. Due to the increase in the number of instructions executed, string processing speed cannot meet the performance requirements of natural language processing.

A reduced instruction set of the RISC-V architecture needs to enhance the string processing capability to meet the string processing requirements of the field of AI applications. An instruction set of the processor, however, is embedded microcode, which requires valuable system resources. Moreover, complex code design of the instruction set can further lead to performance deterioration of the processor.

Instruction Set can be a set of instructions embedded in a processor that are used to calculate and control a processor system. When a processor is designed, the processor can already include an instruction set that matches hardware. Programs written in different languages can be translated (e.g., compiled or interpreted) into a machine language before running on the processor. Therefore, the instruction set reflects basic functions of the processor and is related to the performance of the processor. The instruction set constitutes an important part of the processor performance. Processors may be classified into different types according to their embedded instruction sets, such as an x86 architecture processor, an ARM architecture processor, and an MIPS architecture processor.

Program Counter ("PC") can be a register that stores an instruction address of a next instruction. The processor can acquire and execute an instruction from a memory or a cache according to the instruction address in the PC.

FIG. 1 shows an example schematic of a processor, according to some embodiments of the present disclosure. As shown in FIG. 1, processor 100 can include one or more processor cores 110 for processing instructions. An application or a system platform may control a plurality of processor cores 110 to process and cute the instructions.

In some embodiments, each processor core 110 may be configured to process a specific instruction set. In some embodiments, the instruction set may support complex instruction set computing ("CISC"), RISC, or very long instruction word ("VLIW")-based computing. In some embodiments, different processor cores 110 may process different or identical instruction sets. In some embodiments, processor core 110 may further include other processing circuitries, such as a digital signal processor ("DSP").

In some embodiments, processor 100 may further include a multi-level storage structure such as register file 116, multi-level caches L1, L2, and L3, and memory 113 accessed via a storage bus.

In some embodiments, register file 116 may include a plurality of registers for storing different types of data or instructions. These registers may be of different types. For example, register file 116 may include an integer register, a floating-point register, a status register, an instruction register, a pointer register, etc. In some embodiments, the registers in register file 116 may be implemented using general-purpose registers. In some embodiments, the registers in register file 116 may adopt a specific design according to actual requirements of processor 100.

In some embodiments, caches L1, L2, and L3 may be integrated in whole or in part in each processor core 110. For example, first-level cache L1 can be located inside a processor core 110 and includes instruction cache 118 for storing instructions and data cache 119 for storing data. In some embodiments, in different architectures, at least one level of cache (e.g., third-level cache L3 shown in FIG. 1) may be located outside and shared by a plurality of processor cores 110. In some embodiments, processor 100 may further include an external cache.

In some embodiments, processor 100 may include memory management unit ("MMU") 112 having circuitry for implementing the translation from a virtual address to a physical address. A cache in MMU 112 can include a mapping relationship between a part of virtual addresses and physical addresses. MMU 112 may also acquire a mapping relationship that is not cached from the memory. In some embodiments, one or more MMUs 112 may be provided in each processor core 110. MMUs 112 in different processor cores 110 may also be synchronized with MMUs 112 located in other processors or processor cores, so that each processor or processor core may share a unified virtual storage system.

In some embodiments, processor 100 is configured to execute an instruction sequence (e.g., an application). The process of executing each instruction by processor 100 can include fetching instructions from the memory, decoding the fetched instructions, executing the decoded instructions, and saving an instruction execution result. In some embodiments, these steps can be repeated until all the instructions in the instruction sequence are executed or a shutdown instruction is encountered.

To realize the above process, processor 100 may include an instruction fetch circuitry 114, a decoding circuitry 115, an instruction transmission circuitry (not shown), an execution circuitry 111, and an instruction retirement circuitry (not shown).

In some embodiments, instruction fetch circuitry 114 can be a start engine for processor 100. Instruction fetch circuitry 114 can be configured to migrate instructions from instruction cache 118 or memory 113 to an instruction register (e.g., a register for storing instructions in register file 118), and receive a next instruction fetch address or compute a next instruction fetch address according to an instruction fetch algorithm. The instruction fetch algorithm can include, for example, increasing or decreasing the address according to an instruction length.

In some embodiments, after fetching an instruction, decoding circuitry 115 can be configured to interpret and decode the retrieved instruction according to an instruction format. Decoding circuitry 115 can be further configured to recognize and distinguish different instruction types and operand acquisition information. The operand acquisition information may point to an immediate number or a register for storing an operand. In some embodiments, decoding circuitry 115 can be further configured to prepare for the operation of execution circuitry 111.

In some embodiments, the instruction transmission circuitry can be included in processor 100. The instruction transmission circuitry can be communicatively coupled with decoding circuitry 115 and execution circuitry 111, and can be configured for instruction scheduling and control to efficiently distribute instructions to different execution circuitry 111, making parallel operation of a plurality of instructions possible. After an instruction is fetched, decoded, and scheduled to corresponding execution circuitry 111, the corresponding execution circuitry 111 can start executing the instruction, such as performing an operation indicated by the instruction.

In some embodiments, the instruction retirement circuitry can be configured to write an execution result generated by execution circuitry 111 into a corresponding storage position (e.g., a register inside processor 100). As a result, subsequent instructions can acquire a corresponding execution result from the storage position.

For different types of instructions, different execution circuitries 111 may be provided in processor 100 accordingly. Execution circuitry 111 may be an operation circuitry (e.g., including an arithmetic logic circuitry, a vector operation circuitry, etc. for performing operations according to operands and outputting operation results), a memory execution circuitry (e.g., a memory execution circuitry configured to access a memory according to an instructions to read data in the memory or write specified data to the memory, etc.), a co-processor, etc. In some embodiments, in processor 100, all execution circuitry 111 may run in parallel and output corresponding execution results.

In some embodiments, processor 100 is a multi-core processor, including a plurality of processor cores 110 sharing third-level cache L3. In some embodiments, processor 100 may be a single-core processor, or a logic element for processing instructions in an electronic system. The present disclosure is not limited to any particular types of processor.

In some embodiments, processor 100 includes not only standard instructions of an ISA of the processor, but also a byte comparison instruction, which is an extended instruction for string processing. When the byte comparison instruction (e.g., "tstnbz") is executed, a result value is generated according to content of a source string. The result value can be used to quickly locate an ending identifier, so that the number of instructions needed for string comparison can be reduced, hence shortening an execution time of a string comparison operation.

Figure 2:
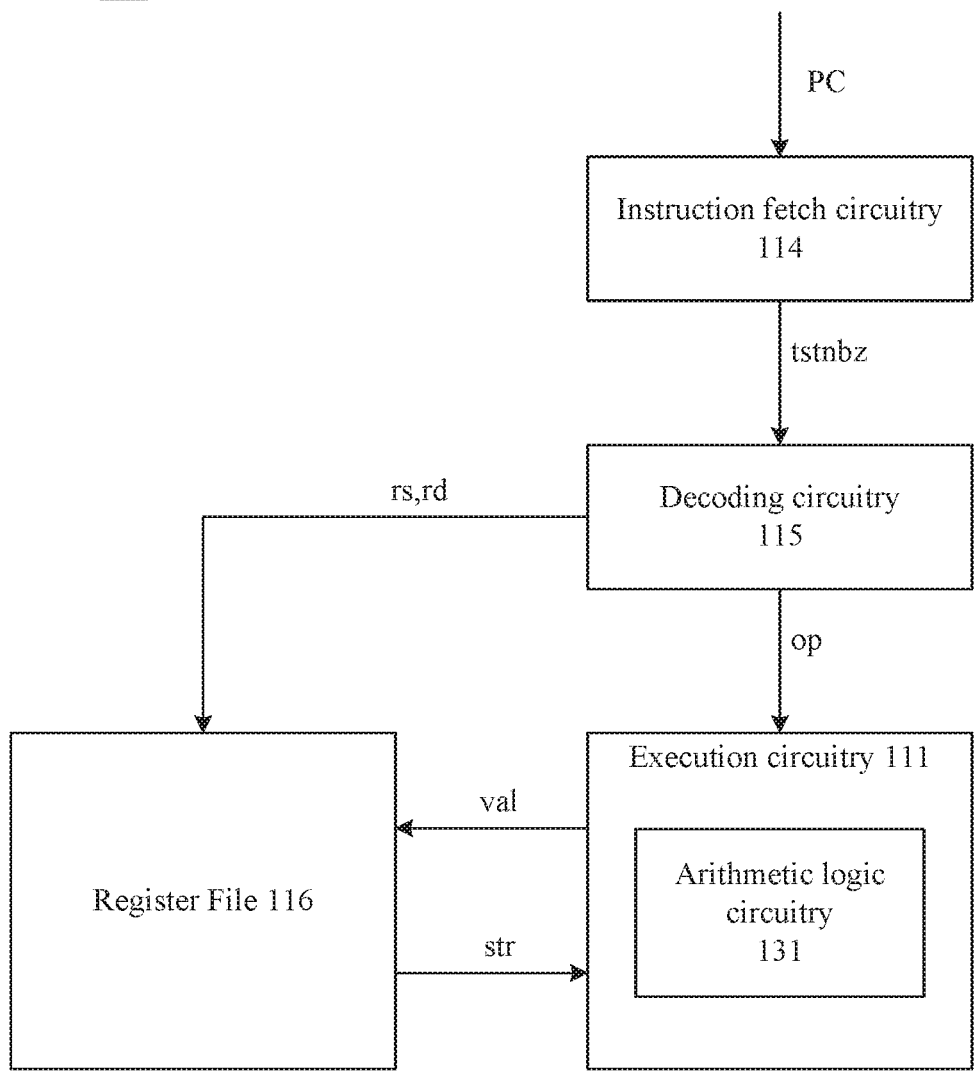
FIG. 2 shows an example schematic of an instruction processing apparatus, according to some embodiments of the present disclosure.

FIG. 2 shows an example schematic of an instruction processing apparatus, according to some embodiments of the present disclosure. As shown in FIG. 2, instruction processing apparatus 210 comprises circuitries related to the byte comparison instruction.

In some embodiments, instruction processing apparatus 210 includes a processor, a processor core of a multi-core processor, or a processing element in an electronic system. In some embodiments, instruction processing apparatus 210 can be the processor core of processor 100 shown in FIG. 1, and include the same units or circuitries as those in FIG. 1.

In some embodiments, instruction processing apparatus 210 is based on a RISC architecture in some embodiments, instruction processing apparatus 210 includes not only standard instructions of RISC, but also a byte comparison instruction (e.g., "tstnbz") as an extended instruction, thereby improving the string processing performance of the processor.

In some embodiments, when an application is run on instruction processing apparatus 210, the application has been compiled into an instruction sequence including a plurality of instructions. A PC is configured to store an instruction address of an instruction to be executed. Instruction fetch circuitry 114 can acquire an instruction from instruction cache 118 in first-level cache L1 or memory 210 outside instruction processing apparatus 210 according to PC.

In some embodiments, instruction fetch circuitry 114 can acquire the byte comparison instruction from instruction cache 118 shown in FIG. 1, which has the form "tstnbz rd rs." The byte comparison instruction tstnbz includes a first operand specifying a first register rs and a second operand specifying a second register rd. The first operand can be, for example, content or address information of a source string str. The second operand can be, for example, content or address information of a result value val.

In some embodiments, decoding circuitry 115 can decode the instruction to determine an opcode op of the instruction, and the first register rs corresponding to the first operand, and the second register rd corresponding to the second operand in register file 116.

In some embodiments, execution circuitry 111 includes, for example, arithmetic logic circuitry 131. Execution Circuitry 111 can be further configured to perform a corresponding operation according to the opcode op.

In some embodiments, the first register rs and the second register rd can be both 64-bit registers. In some embodiments, the first register rs and the second register rd can be 8, 16, 32, 64, 128, or 512-bit wide registers.

In some embodiments, the first register rs and the second register rd can store the content of the source string str and the content of the result value val, respectively. When arithmetic logic circuitry 131 in execution circuitry 111 executes the byte comparison instruction according to the opcode op, the content of the source string str is acquired from the first register rs, and the result value is saved in the second register rd.

In some embodiments, the first register rs and the second register rd can store, for example, address information of the source string str and the result value val, respectively. When arithmetic logic circuitry 131 in execution circuitry 111 executes the byte comparison instruction according to the opcode op, execution circuitry 111 accesses the memory according to the address information of the source string saved in the first register rs to obtain content of the source string str. Arithmetic logic circuitry 131 then compares the source string str with an ending identifier byte by byte to obtain a result value, and saves the result value at a memory position corresponding to the address information of the second register rd.

In some embodiments, a source string with a plurality of bytes in the first register needs to be processed using multiple steps in an instruction pipeline when the byte comparison instruction is executed, which may cause processing overheads of the instruction pipeline. Therefore, instruction processing apparatus 210 may further include a hardware register. In some embodiments, the hardware register can include an instruction enable flag for controlling whether execution of the byte comparison instruction is allowed. Execution circuitry 111 can determine whether to execute the byte comparison instruction (e.g., tstnbz) according to a value of the enable flag. When the instruction enable flag indicates that execution of the byte comparison instruction is not allowed (e.g., the enable flag is set to 0), execution circuitry 111 may not execute the instruction, and may optionally generates exception information.

Figure 3:
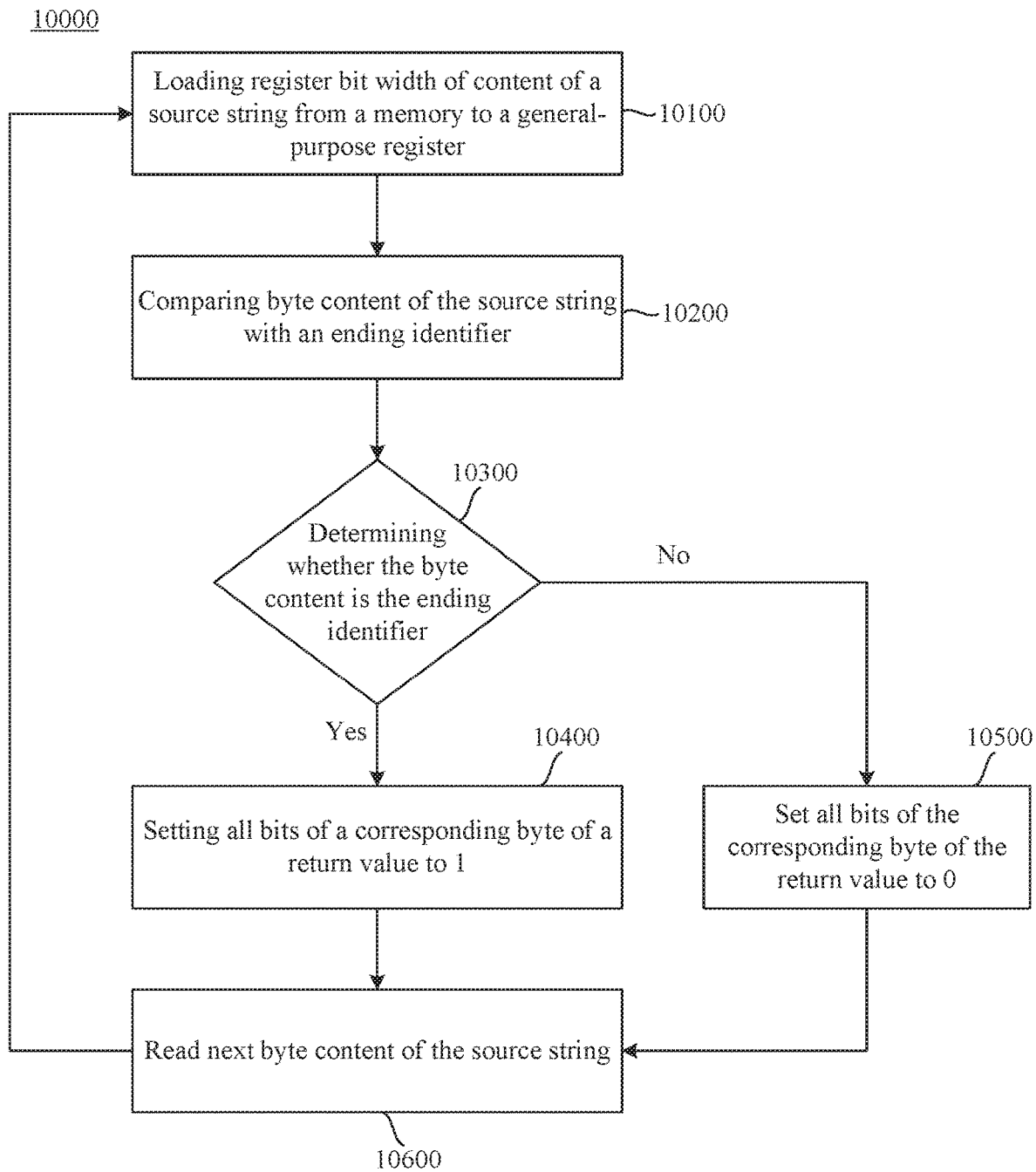
FIG. 3 shows an example flowchart of a byte comparison method, according to some embodiments of the present disclosure.

FIG. 3 shows an example flowchart of a byte comparison method, according to some embodiments of the present disclosure. It is appreciated that the method 10000 shown in FIG. 3 can be executed by the instruction processing apparatus of FIG. 2.

In step 10100, content of a source string (e.g., source string str of FIG. 2) with a size equal to one register bit width of a processor is loaded from a memory to a general-purpose register. For example, in a processor with a 64-bit register bit width, 64-bit data of the source string str can be loaded. In some embodiments, the source string str is loaded starting from a higher-bit byte to lower-bit byte.

In step 10200, 1-byte content of the source string is compared with an ending identifier. For example, if the ending identifier is 00H, which is a byte numerical value represented by a hexadecimal number, the comparison step can include comparing the 1-byte content of the source string with 00H.

In step 10300, it is determined whether the 1-byte content of the source string is an ending identifier according to a comparison result. For example, if the ending identifier is 00H, the determination step can include determining the 1-byte content as the ending identifier when the 1-byte content of the source string is equal to 00H, or determining the 1-byte content as an ordinary character when the 1-byte content of the source string is not equal to 00H.

In steps 10400 and 10500, a numerical value is set for a corresponding byte of a result value according to a determination result. If the byte of the source string is the ending identifier, all bits of the corresponding byte of the result value are set to 1. If the byte of the source string is the ordinary character, all bits of the corresponding byte of the result value are set to 0.

In step 10600, content of a next byte of the source string is read. For example, the content of the next byte is read in order from a higher-bit byte to a lower-bit byte. Then, the method can return to step 10100 to determine whether the next byte of the source string is the ending identifier.

In some embodiments, after the entire byte content of the source string loaded into the general-purpose register is compared and a corresponding result value is generated, steps 10100 to 10600 can be ended to generate a comparison result. The result value is a location marker of the source string. In some embodiments, the result value has the same byte length as that of the source string. In some embodiments, all bits of the byte corresponding to the ending identifier are set to 1, and all bits of the byte corresponding to the ordinary character are set to 0. The non-zero result value can represent the presence of the ending identifier, and the number of shifts from non-zero to zero can represent a byte position of the ending identifier.

In some embodiments, all the byte contents of the source string loaded into the general-purpose register are traversed in a cycled manner, so that the determination of all the byte contents can be completed even if the bit width of the general-purpose register of the processor is not obtained.

In some embodiments, the bit width of the general-purpose register of the processor is known. As a result, the byte comparison instruction may be further simplified. Starting from a higher-bit byte to a lower-bit byte, a predetermined number of comparison instructions may be executed to traverse all the byte contents of the source string loaded into the general-purpose register.

In some embodiments, a processor with a 64-bit register bit width can be taken as an example. FIG. 4 shows an example pseudocode of a byte comparison instruction tstnbz, according to some embodiments of the present disclosure.

As shown in FIG. 4, the byte comparison instruction tstnbz can determine whether the source string str (e.g., rs[63:0]) in the general-purpose register includes the ending identifier and save the result value val (e.g., rd[63:0]) in the general-purpose register. The source string str and the result value val are 64 bits or 8 bytes. In some embodiments, the process of the byte comparison instruction tstnbz can include testing whether all bits of the selected byte of the source string str are all 0 byte by byte starting from a higher-bit byte to a lower-bit byte. If all bits of the selected byte of the source string str are 0, all bits of the corresponding byte of rd in the result value can be set to 1. If at least 1 bit of the selected byte of the source string str is not 0, all bits of the corresponding byte of rd in the result value can be set to 0.

In some embodiments, the comparison instruction (e.g., tstnbz of FIG. 4) can compare the source string str with the ending identifier byte by byte, and writes back the result value byte by byte. The result value is a location marker of the source string. In some embodiments, the result value can have the same byte length as that of the source string. In some embodiments, all bits of the byte corresponding to the ending identifier are set to 1, and all bits of the byte corresponding to the ordinary character are set to 0. The result value can be used to quickly locate the ending character. In some embodiments, according to whether the result value is non-zero, a subtraction instruction may be further used to compare the size of the source string with the size of another string, so that the number of instructions required for string comparison can be reduced to shorten an execution time of a string comparison operation.

It is appreciated that the byte comparison instruction (e.g., tstnbz of FIG. 4) in the form of assembly code can be applicable to all register bit widths. For example, applicable register bit widths can include 8, 16, 32, 64, 128, and 512 bit widths.

In some embodiments, the ending identifier is 00H. In some embodiments, the ending identifier may be any numerical value that conforms to system specifications, such as 0FFH.

In some embodiments, all bits of the corresponding byte of the result value corresponding to the ending identifier are all set to 1. In some embodiments, different numerical values can be set for the byte of the result value corresponding to the ending identifier and the byte corresponding to the ordinary character, respectively, without being limited to a specific numerical value. For example, the byte of the result value corresponding to the ending identifier can be set to any one of 0FFH, 01H, and 080H, and the byte of the result value corresponding to the ordinary character can be set to any one of 00H and 010H.

In some embodiments, the byte comparison instruction tstnbz can be implemented in the processor based on the RISC architecture. In some embodiments, according to the assembly code of the byte comparison instruction tstnbz, it can be understood that the byte comparison instruction tstnbz may be implemented in processors with a CISC architecture, a RISC architecture, and a VLIW architecture in order to achieve quick location of the ending identifier, thereby improving the string processing capabilities of the processors.

Figure 5:
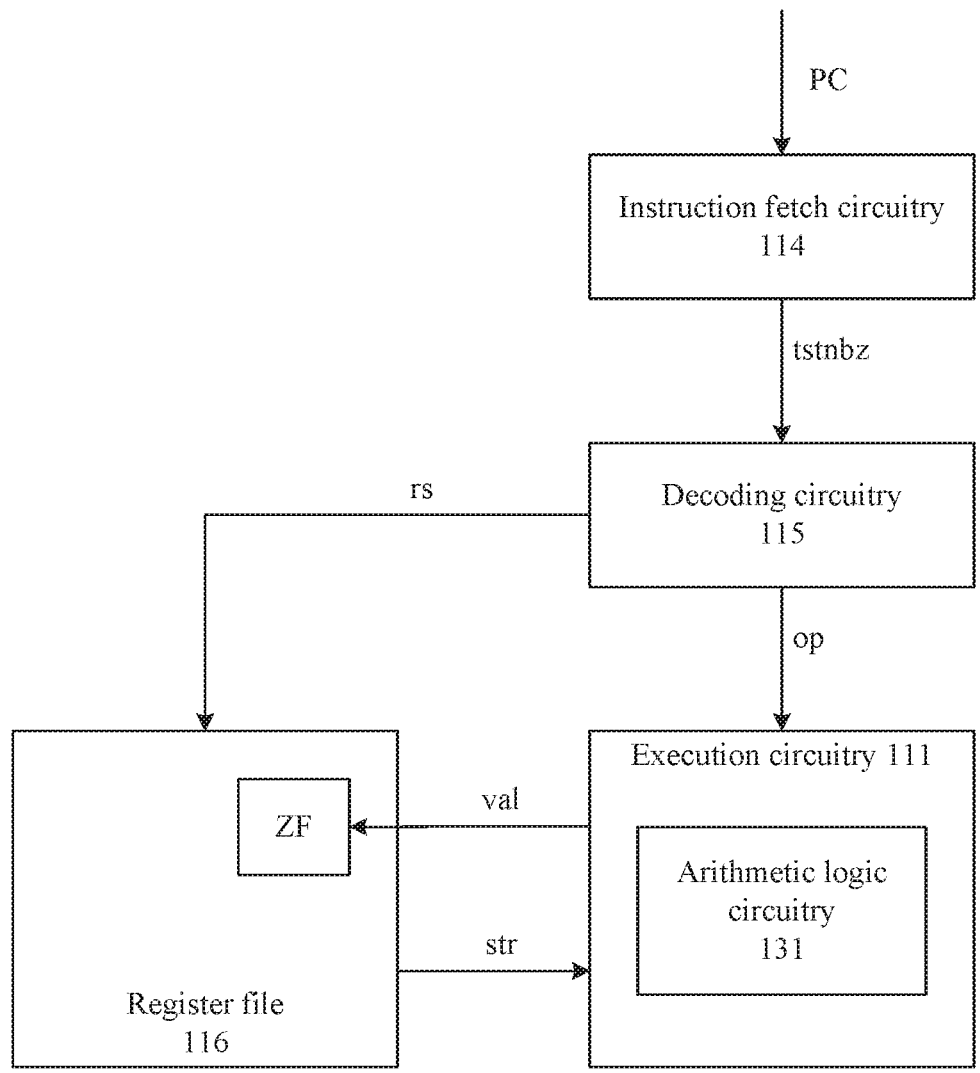
FIG. 5 shows an example schematic of an instruction processing apparatus, according to some embodiments of the present disclosure.

FIG. 5 shows an example schematic of an instruction processing apparatus, according to some embodiments of the present disclosure. Units or circuitries related to the byte comparison instruction of instruction processing apparatus 310 are shown in FIG. 5.

As shown in FIG. 5, instruction processing apparatus 310 can include a processor, a processor core of a multi-core processor, or a processing element in an electronic system. In some embodiments, instruction processing apparatus 310 can be the processor core of processor 100 shown in FIG. 1, and includes units, modules, or circuitries of processor 110 shown in FIG. 1.

In some embodiments, instruction processing apparatus 310 can be based on a RISC architecture, and includes not only standard instructions of RISC, but also a byte comparison instruction (e.g., tstnbz of FIG. 4) as an extended instruction, thereby improving the string processing performance of the processor.

In some embodiments, when an application is run on instruction processing apparatus 310, the application has been compiled into an instruction sequence including a plurality of instructions. In some embodiments, a program counter PC can be configured to store an instruction address of an instruction to be executed. Instruction fetch circuitry 114 can acquire an instruction from instruction cache 118 shown in FIG. 1 in first-level cache L1 or memory 113 outside instruction processing apparatus 310 according to a numerical value of the program counter PC.

In some embodiments, instruction fetch circuitry 114 can acquire the byte comparison instruction (e.g., tstnbz of FIG. 4) from instruction cache 118 shown in FIG. 1, which has the following form: tstnbz rs. In some embodiments, the byte comparison instruction tstnbz includes a first operand specifying a first register rs. The first operand is, for example, content or address information of a source string str.

In some embodiments, decoding circuitry 115 can decode the instruction to determine an opcode op of the instruction, and the first register rs corresponding to the first operand in register file 116.

In some embodiments, execution circuitry 111 can include, for example, arithmetic logic circuitry 131, and can perform a corresponding operation according to the opcode op.

In some embodiments, the first register rs can store the content of the source string str and the content of the result value val. When arithmetic logic circuitry 131 in execution circuitry 111 executes the byte comparison instruction according to the opcode op, the content of the source string str is acquired from the first register rs, and a flag register ZF is provided according to the result value.

In some embodiments, the first register rs can store, for example, address information of the source string str. When arithmetic logic circuitry 131 in execution circuitry 111 executes the byte comparison instruction according to the opcode op, execution circuitry 111 can access the memory according to the address information of the source string saved in the first register rs to obtain content of the source string str. The execution circuitry 111 can compare the source string str with an ending identifier byte by byte to obtain a result value, and set the flag register ZF according to the result value.

A source string with a plurality of bytes in the first register may need to be processed using multiple steps in an instruction pipeline when the byte comparison instruction is executed, which may cause processing overheads of the instruction pipeline. Therefore, in some embodiments, instruction processing apparatus 310 may further include a hardware register. In some embodiments, the hardware register can include an instruction enable flag for controlling whether execution of the byte comparison instruction is allowed. Execution circuitry 111 can determine whether to execute the byte comparison instruction tstnbz according to a value of the enable flag. For example, when the instruction enable flag indicates that execution of the byte comparison instruction tstnbz is not allowed (e.g., the enable flag is set to 0), execution circuitry 111 does not execute the instruction, and can optionally generates exception information.

FIG. 6 shows an example pseudocode of a byte comparison instruction tstnbz with flag register zf, according to some embodiments of the present disclosure.

As shown in FIG. 6, the byte comparison instruction tstnbz can determine whether the source string str (e.g., rs[63:0]) in the general-purpose register includes the ending identifier, and sets a flag bit of the flag register ZF according to a determined result. In the example shown in FIG. 6, the source string str is 64 bits or a total of 8 bytes. After setting the flag register ZF to 0, it is tested whether all bits of the selected byte of the source string str are all 0 byte by byte starting from a higher-bit byte to a lower-bit byte. In some embodiments, if all bits of the selected byte of the source string str are 0, the flag register ZF is set to 1. If at least 1 bit of the selected byte of the source string str is not 0, the flow proceeds to determine a next byte.

The instruction tstnbz shown in FIG. 6 can compare the source string str with the ending identifier byte by byte, and sets the flag register ZF according to the result value. In some embodiments, if the value of the flag register ZF is 0, the source string str does not include the ending identifier. If the value of the flag register ZF is 1, the source string str includes the ending identifier. Therefore, according to whether the flag bit of the flag register ZF is non-zero, a jump instruction may be further used to execute a subtraction instruction to compare the size of the source string with the size of another string, so that the number of instructions required for string comparison can be reduced to shorten execution time of the string comparison operation.

Figure 7:
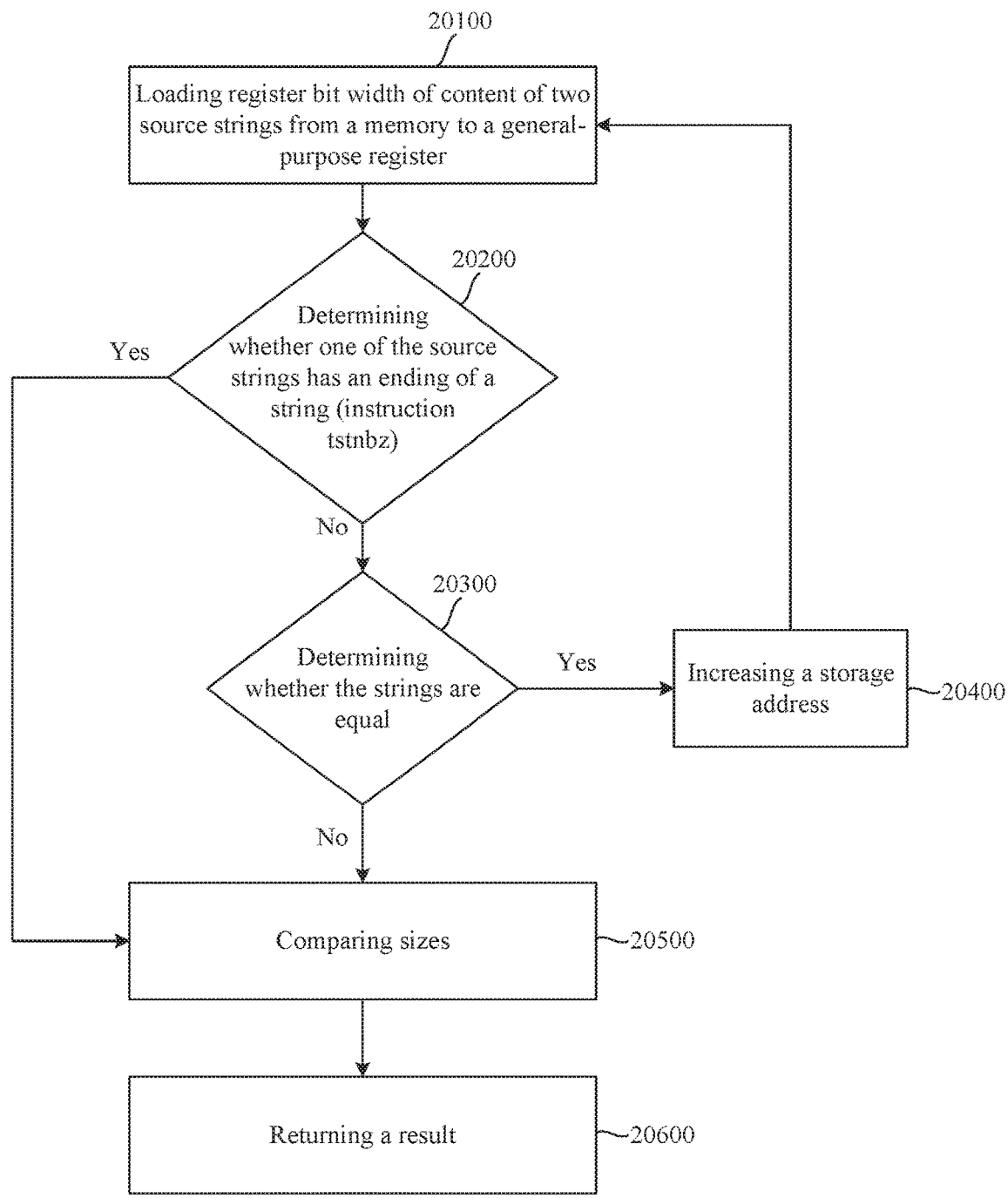
FIG. 7 shows an example flowchart of a string comparison method, according to some embodiments of the present disclosure.

FIG. 7 shows an example flowchart of a string comparison method, according to some embodiments of the present disclosure. It is appreciated that method 20000 shown in FIG. 7 can be executed by an instruction processing apparatus (e.g., instruction processing apparatus 310 of FIG. 5). In some embodiments, the instruction processing apparatus comprises one or more processor cores based on a RISC architecture. In some embodiments, the one or more processor cores can execute standard instructions of RISC plus a byte comparison instruction tstnbz.

In some embodiments, a string comparison function (e.g., compare (str1, str2)) can be used to compare two source strings str1 and str2 and return an integer according to a comparison result. For example, if str1 matches str2, a value of zero can be returned. If str1 is smaller than str2, a negative number can be returned. If str1 is larger than str2, a positive number can be returned. The string comparison instruction strcmp can use the byte comparison instruction tstnbz to quickly locate the ending identifier, so that the number of instructions required for string comparison can be reduced to shorten an execution time of a string comparison operation.

Referring back to FIG. 7, in step 20100, content of one register bit width in a source string str1 and content of one register bit width in a source string str2 can be loaded from a memory to a first general-purpose register and a second general-purpose register, respectively. For example, in a processor with a 64-bit register bit width, 64-bit data of source strings str1 and 64-bit data of source string str2 can be loaded. In some embodiments, contents are loaded from a higher-bit byte to a lower-bit byte, and a total of 8 bytes of data can be loaded respectively for a 64-bit register bit width.

In step 20200, it is determined whether one of the source strings (e.g., source string str1) has a string ending. In some embodiments, a result value val can be obtained using the byte comparison instruction tstnbz on one of the source strings. In some embodiments, the result value val can be obtained using the byte comparison instruction tstnbz on source string str1. A numerical value of the result value represents whether the source string includes an ending of the string. As described above, the byte comparison instruction tstnbz can write result value val back to the register byte by byte. Therefore, it is easier to know which byte is 0, thereby quickly locating an ending identifier.

In step 20300, an XOR instruction xor is used to determine whether the content of the first general-purpose register and the content of the second general-purpose register are equal. If the contents are equal and the ending of the string is not included, step 20400 is executed.

In step 20400, a storage address increases. In some embodiments, the storage address increments, and the address increment value can be determined by a register bit width. Then, method 20000 can return to step 20100, and the content of a next register bit width in the source string str1 and the content of a next register bit width in the source string str2 are loaded to the first general-purpose register and the second general-purpose register, respectively.

If the contents are unequal in step 20300 or the ending of the string is included in step 20200, step 20500 is executed. In step 20500, sizes of the data in the first general-purpose register and the second general-purpose register are compared. In some embodiments, a subtraction instruction sub is used to determine a size relationship between data in the first general-purpose register and data in the second general-purpose register. In some embodiments, after the subtraction instruction is executed, the operation can end, and a corresponding result can be returned.

FIG. 8 shows an example pseudocode of a string comparison function strcmp, according to some embodiment of the present disclosure. As shown in FIG. 8, the instruction can be performed according to a 64-bit register bit width.

As shown in FIG. 8, it is appreciated that steps 20200 to 20400 in FIG. 7 may be completed using only three instructions, which are a byte comparison instruction tstnb, an XOR instruction xor, and an OR instruction or.

In some embodiments, the function of the byte comparison instruction tstnb is to determine whether the first general-purpose register includes an ending of the string by determining whether each byte in the first general-purpose register is equal to 0H. In some embodiments, if a certain byte is equal to 0H, a corresponding byte of a result value t0 can be written with 0FFH. If no byte is equal to 0H, the corresponding byte of the result value t0 can be written with 0H.

In some embodiments, the function of the XOR instruction xor is to determine whether the content of the first general-purpose register and the content of the second general-purpose register equal by an XOR operation. In some embodiments, if the content of the first general-purpose register and the content of the second general-purpose register are equal, a numerical value of a result value t1 can be set to 0H. If the content of the first general-purpose register and the content of the second general-purpose register are not equal, the numerical value of the result value t1 can be set to 0FFH.

In some embodiments, the function of the OR instruction or is to further determine a size relationship between data in the first general-purpose register and data in the second general-purpose register by a subtraction operation if there is an ending identifier (e.g., the numerical value of the result value t0 is non-zero) or contents of one register bit width of two source strings are unequal (e.g., the numerical value of the result value t1 is non-zero). In some embodiments, by incorporating the OR instruction and the XOR instruction, the number of subtraction operation can be reduced, thereby further improving the performance of the string comparison operation.

As shown in FIG. 8, the string comparison function strcmp can use the extended byte comparison instruction tstnbz in the processor architecture, and a plurality of instruction combinations are not required in consecutive byte comparison operations to achieve a function of determining whether the ending identifier is included. Therefore, the number of instructions required for achieving the function can be reduced, and the performance of the string comparison operation can be improved.

Figure 9:
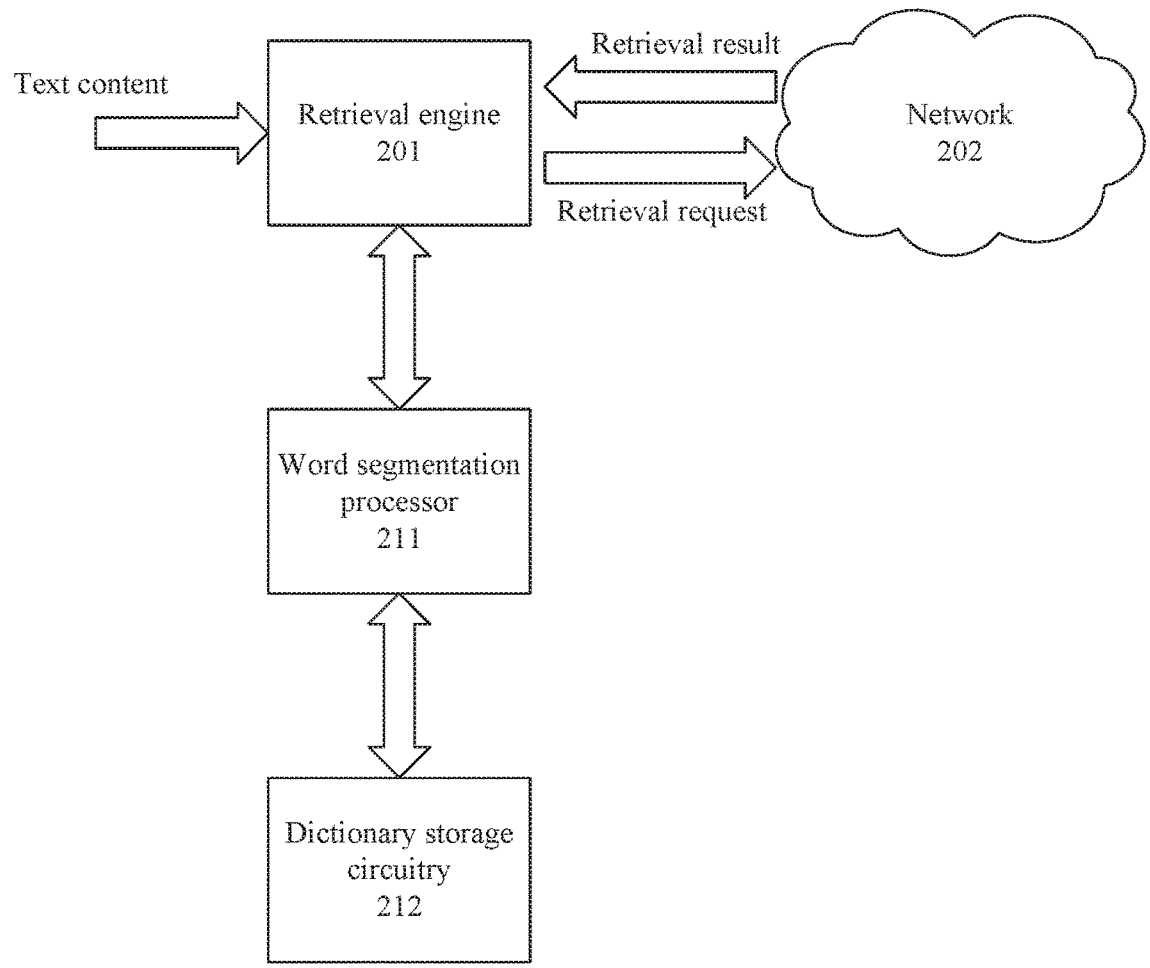
FIG. 9 shows an example schematic of a retrieval system, according to some embodiments of the present disclosure.

FIG. 9 shows an example schematic of a retrieval system, according to some embodiments of the present disclosure. As shown in FIG. 9; retrieval system 410 includes retrieval engine 201, network 202, word segmentation processor 211, and dictionary storage circuitry 212.

In some embodiments, retrieval engine 201 may be any terminal, such as a personal computer, a mobile phone, a tablet, or a smart home appliance. The smart home appliance can be, for example, a smart speaker, a TV, a refrigerator, a washing machine, etc., and the smart home appliance can be embedded with a system on chip. Retrieval engine 201 can include a processor for converting voice content or text content input by a user via interactive devices such as a keyboard, a mouse, a remote control, a touch screen, and a microphone into text in a natural language form. For example, retrieval engine 201 on the smart speaker can convert the voice of the user into text, and generate text content in a natural language form. Retrieval engine 201 can process the text content into a retrieval request and sends the retrieval request to network 202 to acquire a retrieval result related to query elements time, place, and query content).

In some embodiments, word segmentation processor 211 and dictionary storage circuitry 212 are, for example, the processor and the memory of computer system 100 shown in FIG. 1, respectively. Word segmentation processor 211 can include not only standard instructions of RISC, but also an extended byte comparison instruction tstnbz, which can improve the string processing performance of the processor.

In some embodiments, retrieval engine 201 and word segmentation processor 211 can be different hardware devices. In some embodiments, if the processor of retrieval engine 201 includes the byte comparison instruction tstnbz, the processor of retrieval engine 201 may also function as word segmentation processor 211. Therefore, an independent word segmentation processor 211 may be omitted.

In some embodiments, retrieval engine 201 can be a smart speaker. Retrieval engine 201 can convert voice content input by a user via a microphone into text in a natural language form, such as "How is the weather in Beijing today?" In a natural language processing technology, the text content above is language text without word boundary markers. It is difficult for the computer system to understand the query elements according to the text content in a natural language form to establish a retrieval formula, and thus it is difficult to obtain a desired retrieval result.

In some embodiments, in order to process the natural language into query elements, retrieval engine 201 can send the text content into word segmentation processor 211. Dictionary storage circuitry 212 can store a plurality of entries in advance to form a word segmentation dictionary. Word segmentation processor 211 can perform word segmentation processing on the text content according to a word segmentation algorithm.

In some embodiments, the dictionary-based word segmentation algorithm can be a string matching. Based on a certain algorithm strategy, a string to be matched is matched with a string of a sufficiently large dictionary. If they are matched, words may be segmented. Different matching strategies can include a forward maximum matching method, a reverse maximum matching method, bidirectional matching word segmentation, full segmentation path selection, etc. For example, according to the maximum matching method, if the longest entry that can match the input text is found in the dictionary, a word is recognized, and the recognized word can be used as a segmentation unit. By analogy, a given text is word-segmented into a segmentation unit sequence composed of segmentation units. The segmentation unit can include not only successfully matched words, but also single words or dynamically recognized words.

Word segmentation processor 211 in the retrieval system can retrieve text content provided by retrieval engine 201 (e.g., text content "How is the weather in Beijing today?"). After word segmentation, a plurality of entries are generated, such as "Beijing", "Today", "Weather", and "How", thereby generating a plurality of query elements, such as time, place, and query content. Retrieval engine 201 can obtain query elements from word segmentation processor 211, so that a retrieval formula may be constructed (e.g., "Beijing" ANT) "Today" AND "Weather") A retrieval request can be generated, and the retrieval request can be sent to network 202 to obtain a retrieval structure.

In the natural language processing, word segmentation processor 211 can perform a large number of string comparison operations such as comparing the text content with the dictionary of the word segmentation dictionary. Word segmentation processor 211 can then obtain a hit entry when part of the text content is consistent with the entry of the word segmentation dictionary as a word segmentation result, thereby generating query elements. In some embodiments, word segmentation processor 211 includes not only standard instructions of RISC, but also an extended byte comparison instruction tstnbz, so that the string processing performance of the processor can be improved. Therefore, the speed of natural language processing can be greatly increased.

Figure 10:
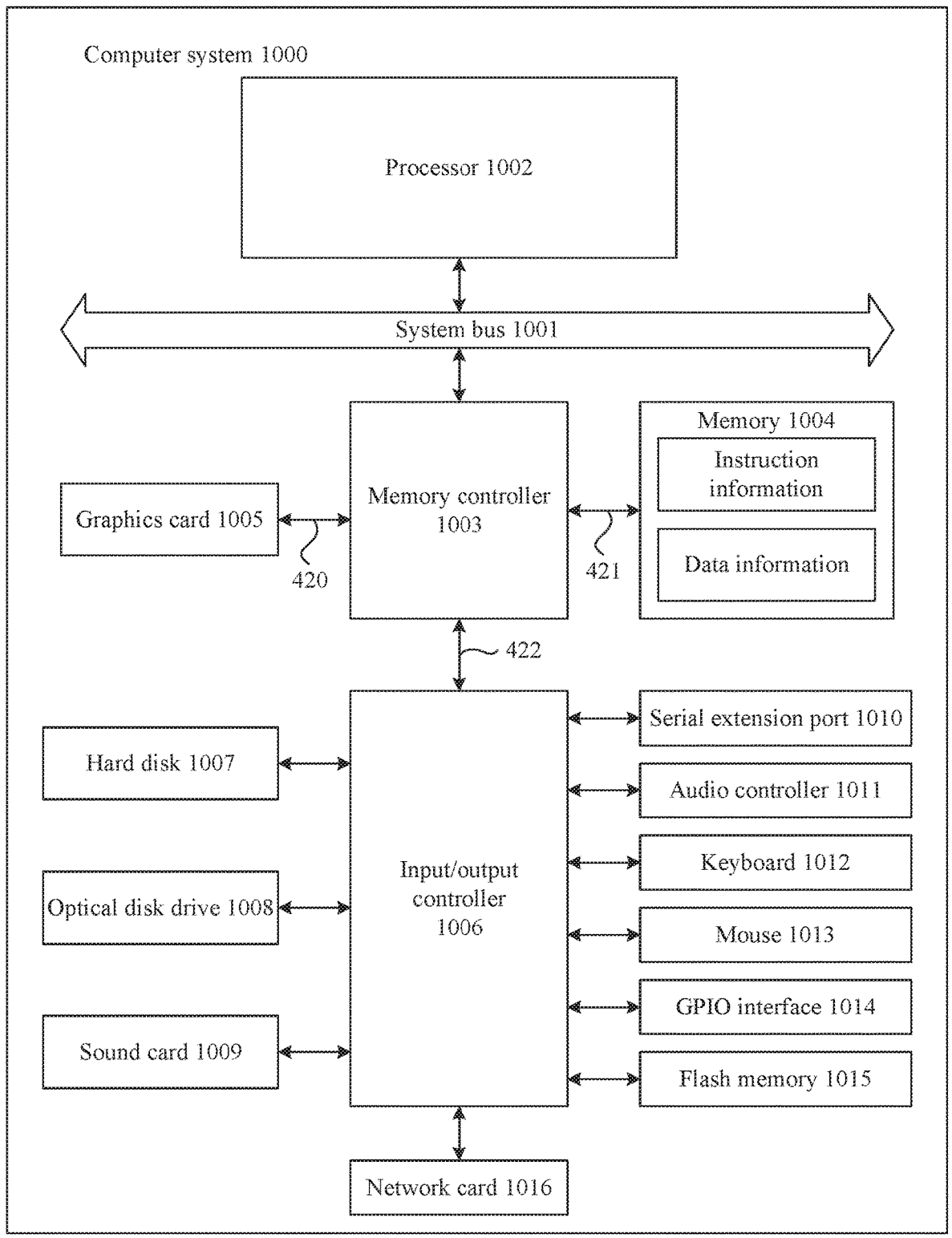
FIG. 10 shows an example schematic of a computer system, according to some embodiments of the present disclosure.

FIG. 10 shows an example schematic of a computer system, according to some embodiments of the present disclosure. As shown in FIG. 10, computer system 1000 can be an example of a "central" system architecture. Computer system 1000 may be constructed based on various types of processors and may be driven by operating systems such as a WINDOWS operating system, a UNIX operating system, or a Linux operating system. In addition, computer system 1000 can be implemented in a PC, a desktop, a laptop, or a server.

As shown in FIG. 10, computer system 1000 includes processor 1002. Processor 1002 may be a CISC architecture, a RISC architecture, or a VLIW architecture processor, or a processor that implements the above instruction set combinations, or any processor device having a dedicated purpose.

Processor 1002 can be communicatively coupled to system bus 1001, and system bus 1001 may transmit data signals between processor 1002 and other units.

Computer system 1000 can further include memory 1004 and graphics card 1005. Memory 1004 may be a dynamic random access memory ("DRAM") device, a static random access memory ("SRAM") device, a flash memory device, or other memory devices. Memory 1004 may store instruction information or data information represented by data signals. Graphics card 1005 can include a display driver for controlling the correct display of a display signal on a display screen.

Graphics card 1005 and memory 1004 can be coupled to system bus 1001 via memory controller 1003. Processor 1002 may communicate with memory controller 1003 via system bus 1001. Memory controller 1003 can provide high-bandwidth memory access path 421 to memory 1004 for storing and reading instruction information and data information. Memory controller 1003 and graphics card 1005 can transmit the display signal based on graphics card signal input/output interface 420. Graphics card signal input/output interface 420 is, for example, an interface type such as digital visual interface ("DVI") or high-definition multimedia interface ("HDMI").

In some embodiments, memory controller 1003 not only transmits digital signals between processor 1002, memory 1003, and graphics card 1005, but also realizes bridging of digital signals between system bus 1001, memory 1004, and input/output ("I/O") controller 1006.

In some embodiments, computer system 1000 can further include I/O controller 1006, which can be coupled to memory controller 1003 through dedicated hub interface bus 422, and connects some I/O devices to I/O controller 1006 via a local I/O bus. The local 170 bus can be configured to communicatively couple a peripheral device with FO controller 1006, and further to memory controller 1003 and system bus 1001. The peripheral device can include hard disk 1007, optical disk drive 1008, sound card 1009, serial extension port 1010, audio controller 1011, keyboard 1012, mouse 1013, GPIO interface 1014, flash memory 1015, or network card 1016.

In some embodiments, different computer systems have different structure diagrams according to different motherboards, operating systems, and ISAs. For example, many current computer systems integrate memory controller 1003 into processor 1002, so that I/O controller 1006 becomes a control center coupled to processor 1002.

In some embodiments, processor 1002 includes not only standard instructions of an ISA, but also a byte comparison instruction tstnbz described above, as an extended instruction for string processing. When the byte comparison instruction tstnbz is executed, a result value generated according to content of a source string can be used to quickly locate an ending identifier, so that the number of instructions required for string comparison can be reduced to shorten an execution time of a string comparison operation.

Figure 11:
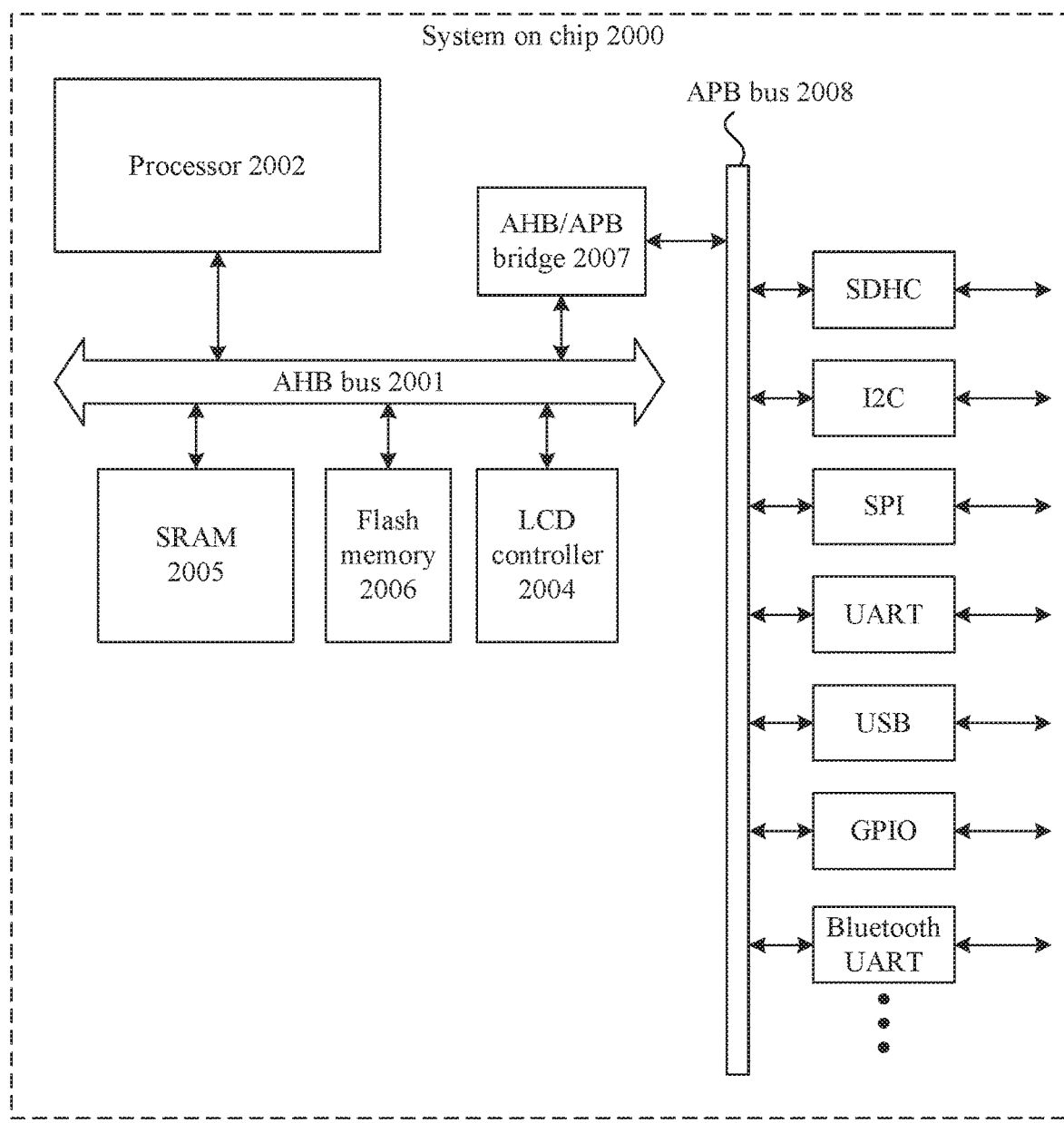
FIG. 11 shows an example schematic of a system on chip, according to some embodiments of the present disclosure.

FIG. 11 shows an example schematic of a system on chip, according to some embodiments of the present disclosure. As shown on FIG. 11, system on chip 2000 can be a system integrated with a single chip, which may be produced and sold as an independent device, or combined with other components to form a new device.

In some embodiments, system on chip 2000 may include different types of processors, and may be driven by operating systems such as WINDOWS, UNIX, Linux, Android, and RTOS. System on chip 2000 may be implemented in computer devices, handheld devices, or embedded products.

Some examples of the handheld devices include cellular phones, Internet protocol devices, digital cameras, personal digital assistants ("PDAs"), and handheld PCs. The embedded products may include network computers ("NetPC"), set-top boxes, network hubs, wide area network ("WAN") switches, or any other systems that may execute one or more instructions.

As shown in FIG. 11, system on chip 2000 can include processor 2002, SRAM 2005, LCD controller 2004, flash memory 2006, and AHB/APB (e.g., advanced high performance and advanced peripheral bus) bridge 2007 communicatively coupled via advanced high performance bus ("AHB") 2001.

Processor 2002 may be a CISC microprocessor, an RISC microprocessor, a VLIW microprocessor, a microprocessor implementing the above instruction set combination, or any one of other processor devices. Processor 2002 further includes processor core 20021 improved according to the technical solutions provided by the embodiments of the present disclosure, and specific details thereof will be provided below.

In some embodiments, SRAM 2005 and flash memory 2006 are configured to store instruction information and/or data information represented by digital signals. For example, SRAM 2005 may be used as a running space for various applications to create heaps and stacks and store intermediate data for various applications. Flash memory 2006 may store the executable code of various applications and the executable code of operating systems.

In some embodiments, AHB bus 2001 is configured to transmit digital signals between high-performance modules or circuitries of system on chip 2000. For example, ABB bus 2001 can transmit digital signals between processor 2002 and SRAM 2005, between processor 2002 and LCD controller 2004, between processor 2002 and flash memory 2006, or between processor 2002 and AHB/APB bridge 2007.

In some embodiments, AHB/APB bridge 2007 is configured to bridge the data transmission between an AHB bus and an APB bus. By latching address, data and control signals from the AHB bus and providing two-level decoding, selection signals of an APB peripheral device can be generated, thereby realizing the conversion from an AHB protocol to an APB protocol.

System on chip 2000 may further include various interfaces coupled to the APB bus. Various interfaces can include secure digital high capacity ("SDHC") interface, I2C bus, serial peripheral interface ("SPI"), universal asynchronous receiver/transmitter ("UART"), universal serial bus ("USB"), general-purpose input/output ("GPIO"), or Bluetooth UART. Peripheral devices coupled to the interfaces can be, for example, USB devices, memory cards, message transceivers, Bluetooth devices, etc.

In some embodiments, as the complexity of the system on chip design increases and the processing power of processors continues to increase, the performance limitations of a bus structure can become a bottleneck for performance. As a result, there is a need to upgrade the bus structure. For example, a higher-performance advanced extensible interface ("AXI") bus has been introduced on the basis of the above AHB bus. Therefore, an AXI bus may be used to replace AHB bus 2001 in FIG. 11. Therefore, although the AHB bus is shown in FIG. 11, the choice of the bus for the system on chip may vary.

In some embodiments, system on chip 2000 includes not only standard instructions of an ISA of processor 2002, but also a byte comparison instruction tstnbz as an extended instruction for string processing. When the byte comparison instruction tstnbz is executed, a result value generated according to content of a source string can be used to quickly locate an ending identifier, so that the number of instructions required for string comparison can be reduced to shorten an execution time of a string comparison operation.

In addition, for the systems shown in FIG. 10 and FIG. 11, it is appreciated that these systems are only used to exemplify some application scenarios of the embodiments of the present disclosure, but are not intended to limit the embodiments of the present disclosure. The present disclosure implements improvements to existing processors or processor cores, and thus can theoretically be applied to systems with any processor architecture and ISA.

The embodiments may further be described using the following clauses:

1. An apparatus, comprising:
a first register configured to store a source string, wherein the source string comprises at least one byte; and
an execution circuitry communicatively coupled to the first register and configured to:
acquire the source string from the first register; and
execute a comparison instruction to compare the at least one byte in the source string with an ending identifier to obtain a result value corresponding to the source string, wherein the comparison instruction is executed on each of the at least one byte in the source string and the result value includes location information of one or more ending identifiers in the source string.

2. The apparatus according to clause 1, further comprising:
a decoding circuitry configured to receive and decode the comparison instruction, wherein the execution circuitry is communicatively coupled to the decoding circuitry and is further configured to receive the decoded comparison instruction from the decoding circuitry.

3. The apparatus according to clause 1 or 2, further comprising:
a second register configured to store the result value, wherein:
the comparison instruction indicates the first register as a first operand of the comparison instruction, and the second register as a second operand of the comparison instruction;
the first register is configured to store content or address information of the source string; and
the second register is configured to store content or address information of the result value.

4. The apparatus according to any one of clauses 1-3, further comprising:
a zero flag register configured to indicate the result value, wherein:
the comparison instruction indicates the first register as a first operand of the comparison instruction,
the first register is configured to store content or address information of the source string, and
the execution circuitry is further configured to modify and set a flag bit of the zero flag register according to the result value.

5. The apparatus according to any one of clauses 1-4, wherein a numerical value of the ending identifier is any one of 00H and 0FFH.

6. The apparatus according to clause 3, wherein the execution circuitry is further configured to execute the comparison instruction that comprises:
at a byte position of the source string where the ending identifier is represented, setting of a corresponding byte of the result value to a first numerical value;

at a byte position of the source string where a non-ending identifier is represented, setting of a corresponding byte of the result value to a second numerical value, wherein the first numerical value is different from the second numerical value.

7. The apparatus according to clause 6, wherein the first numerical value is any one of 0FFH, 01H, and 080H, and the second numerical value is any one of 00H and 010H.

8, The apparatus according to clause 7, wherein the first numerical value is 0FFH, the second numerical value is 00H, and the non-zero result value represents the presence of the ending identifier.

9. The apparatus according to clause 8, wherein:
the result value has the same byte length as that of the source string; and
the execution circuitry is further configured to execute the comparison instruction that further comprises setting of all bits at the byte position corresponding to the ending identifier to 1, and setting of all bits at the byte position corresponding to the non-ending identifier to 0.

10. The apparatus according to clause 9, wherein the execution circuitry is configured to shift the result value by a byte width, wherein the number of shifts from non-zero to zero represents the byte position of the ending identifier.

11. The apparatus according to any one of clauses 1-10, wherein the execution circuitry is configured to perform a string comparison operation, comprising:
loading of contents from the first string and the second string according to a register bit width;
executing of a byte comparison instruction to generate a corresponding first result value using the content of the first string as the source string and determine whether the content of the first string includes the ending identifier according to the first result value; and
in response to a determination that the content of the first string does not include the ending identifier, performance of a size comparison on the content of the first string and the content of the second string.

12. The apparatus according to clause 11, wherein the execution circuitry is further configured to repeat the operations of the loading, the executing of the byte comparison instruction and performance of the size comparison to process the entire content of the first string according to the register bit width.

13. The apparatus according to clause 11, wherein the execution circuitry is configured to perform the size comparison that comprises:
performance of a subtraction operation on the content of the first string and the content of the second string, and
determination of a relative size according to a result of the subtraction operation.

14. The apparatus according to any one of clauses 11-13, wherein the execution circuitry is configured to perform the string comparison operation that further comprises:
performance of a comparison between the content of the first string and the content of the second string; and
in response to a determination that the content of the first string does not include the ending identifier and a comparison indicating that the content of the first string and the content of the second string not being equal, performance of the size comparison on the content of the first string and the content of the second string.

15. The apparatus according to clause 14, wherein the execution circuitry is configured to perform the comparison between the content of the first string and the content of the second string that comprises:

performance of an XOR operation on the content of the first string and the content of the second string to generate a second result value, and
determination of whether the content of the first string and the content of the second string are equal according to the second result value.

16. The apparatus according to clause 15, wherein the non-zero first result value indicates that the content of the first string includes the ending identifier, and the non-zero second result value indicates that the content of the first string and the content of the second string are unequal.

17. The apparatus according to clause 16, wherein the execution circuitry is further configured to:
perform an OR operation on the first result value and the second result value to determine whether the content of the first string does not include the ending identifier and whether the content of the first string and the content of the second string are unequal.

18. The apparatus according to any one of clauses 1-17, wherein the comparison instruction is an assembly code instruction in an extended instruction set of the apparatus.

19. A method for string processing, comprising:
acquiring a source string;
comparing the source string with an ending identifier using an comparison instruction, wherein the comparison instruction comprises comparing each byte of the source string with the ending identifier and the comparison instruction is an assembly code instruction; and
obtaining a result value corresponding to the source string according to a result of the comparison.

20. The method according to clause 19, wherein a numerical value of the ending identifier is any one of 00H and 0FFH.

21. The method according to clause 19 or 20, wherein the comparison instruction further comprises:
at a byte position of the source string where the ending identifier is represented, setting of a corresponding byte of the result value to a first numerical value;
at a byte position of the source string where a non-ending identifier is represented, setting of a corresponding byte of the result value to a second numerical value, wherein the first numerical value is different from the second numerical value.

22. The method according to clause 21, wherein the first numerical value is any one of 0FFH, 01H, and 080H, and the second numerical value is any one of 00H and 010H.

23. The method according to clause 22, wherein the first numerical value is 0FFH, the second numerical value is 00H, and the non-zero result value represents the presence of the ending identifier.

24. The method according to clause 23, wherein:
the result value has the same byte length as that of the source string, and
the comparison instruction further comprises:
setting of all bits at the byte position corresponding to the ending identifier to 1, and
setting of all bits at the byte position corresponding to the non-ending identifier to 0.

25. The method according to clause 24, further comprising:
shifting the result value by a byte width, wherein the number of shifts from non-zero to zero represents the byte position of the ending identifier.

26. The method according to any one of clauses 19-25, further comprising:

obtaining, from a hardware register, an enable flag indicating whether execution of the byte comparison instruction is allowed; and executing the comparison instruction in response to the enable flag indicating that execution of the comparison instruction is allowed.

27. A string comparison method, comprising:

loading corresponding contents respectively from a first string and a second string according to a register bit width;

executing a comparison instruction to generate a corresponding first result value by using the content of the first string as the source string and to determine whether the content of the first string includes an ending identifier according to the first result value, wherein the comparison instruction an assembly code instruction; and in response to a determination that the content of the first string not including the ending identifier; performing size comparison on the content of the first string and the content of the second string.

28. The method according to clause 27, further comprising:

repeating the operations of the loading, the executing of the byte comparison instruction and performance of the size comparison to process the entire content of the first string according to the register bit width.

29. The method according to clause 27, wherein performing size comparison comprises:

performance of a subtraction operation on the content of the first string and the content of the second string using; and determination of a relative size according to a result of the subtraction operation.

30. The method according to clause 27, further comprising:

performing an equality comparison between the content of the first string and the content of the second string; and in response to a determination that the first string does not include the ending identifier and a comparison result indicating that the content of the first string and the content of the second string are not equal, performing size comparison on the content of the first string and the content of the second string.

31. The method according to clause 30, wherein performing equality comparison comprises:

performance of an XOR operation on the content of the first string and the content of the second string to generate a second result value, and determination of whether the content of the first string and the content of the second string are equal according to the second result value.

32. The method according to clause 31, wherein the non-zero first result value indicates that the content of the first string includes the ending identifier, and the non-zero second result value indicates that the content of the first string and the content of the second string are unequal.

33. The method according to clause 32, further comprising:

performing an OR operation on the first result value and the second result value to determine whether the content of the first string does not include the ending identifier and whether the content of the first string and the content of the second string are unequal.

34. The apparatus according to any one of clauses 27-33, wherein the comparison instruction is an instruction in an extended instruction set of an instruction processing apparatus.

35. A computer system, comprising:
a memory; and a processor communicatively coupled to the memory, and comprising:

a first register configured to store a source string, wherein the source string comprises at least one byte; and an execution circuitry communicatively coupled to the first register and configured to:

acquire the source string from the first register; and execute a comparison instruction to compare the at least one byte in the source string with an ending identifier to obtain a result value corresponding to the source string, wherein the comparison instruction is executed on each of the at least one byte in the source string and the comparison instruction is an assembly code instruction.

36. A system on chip, comprising:

an instruction processing apparatus, the instruction processing apparatus comprising:

a first register configured to store a source string, wherein the source string comprises at least one byte; and an execution circuitry communicatively coupled to the first register, and configured to:

acquire the source string from the first register; and execute a comparison instruction to compare the at least one byte in the source string with an ending identifier to obtain a result value corresponding to the source string, herein the comparison instruction is executed on each of the at least one byte in the source string and the comparison instruction is an assembly code instruction.

In various example embodiments described herein are described in the general context of method steps or processes, which may be implemented in one aspect by a computer program product, embodied in a computer-readable medium, including computer-executable instructions, such as program code, executed by computers to program the processors. A computer-readable medium may include removeable and nonremovable storage devices including, but not limited to, Read Only Memory, Random Access Memory, compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

Those skilled in the art should understand that the modules, circuitries, units or components of the device in the examples disclosed herein may be arranged in the device as described in the embodiments, or alternatively may be positioned in one or more devices different from the device. The modules, circuitries, units or components, may be combined into one module or, in addition, may be divided into a plurality of sub-modules.

In addition, those skilled in the art can understand that although some of the embodiments described herein include certain features included in other embodiments but not other features, the combination of features of different embodiments is meant to be within the scope of the present disclosure and form different embodiments.

As used herein, unless otherwise specified, the use of ordinal words "first," "second," "third," etc. to describe ordinary objects merely indicates different instances involving similar objects and is not intended to imply the objects described as such must have a given order in time, space, order, or in any other way.

the drawings and specification, there have been disclosed exemplary embodiments. Many variations and modifications, however, can be made to these embodiments. Accordingly, although specific terms are employed, they are used in a generic and descriptive sense only and not for purposes of limitation, the scope of the embodiments being defined by the following claims.

What is claimed is:

1. An apparatus, comprising:
   a first register configured to store a source string, wherein the source string comprises at least one byte;
   an execution circuitry communicatively coupled to the first register and configured to:
      acquire the source string from the first register; and
      execute a comparison instruction to compare the at least one byte in the source string with an ending identifier to obtain a result value corresponding to the source string, wherein the comparison instruction is executed on each of the at least one byte in the source string and the result value includes location information of the ending identifier in the source string; and
   a zero flag register configured to indicate the result value, wherein the execution circuitry is further configured to modify and set a flag bit of the zero flag register according to the result value.

2. The apparatus according to claim 1, further comprising:
   a decoding circuitry configured to receive and decode the comparison instruction, wherein the execution circuitry is communicatively coupled to the decoding circuitry and is further configured to receive the decoded comparison instruction from the decoding circuitry.

3. The apparatus according to claim 1,
   wherein:
      the comparison instruction indicates the first register as a first operand of the comparison instruction; and
      the first register is configured to store content or address information of the source string.

4. The apparatus according to claim 1, wherein a numerical value of the ending identifier is any one of 00H and 0FFH.

5. The apparatus according to claim 1, wherein the execution circuitry is configured to perform a string comparison operation, comprising:
   loading of contents from the first string and the second string according to a register bit width;
   executing of a byte comparison instruction to generate a corresponding first result value using the content of the first string as the source string and determine whether the content of the first string includes the ending identifier according to the first result value; and
   in response to a determination that the content of the first string does not include the ending identifier, performance of a size comparison on the content of the first string and the content of a second string.

6. The apparatus according to claim 5, wherein the execution circuitry is further configured to repeat the operations of the loading, the executing of the byte comparison instruction and performance of the size comparison to process the entire content of the first string according to the register bit width.

7. The apparatus according to claim 5, wherein the execution circuitry is configured to perform the size comparison that comprises:
   performance of a subtraction operation on the content of the first string and the content of the second string, and
   determination of a relative size according to a result of the subtraction operation.

8. The apparatus according to claim 5, wherein the execution circuitry is configured to perform the string comparison operation that further comprises:
   performance of a comparison between the content of the first string and the content of the second string; and
   in response to a determination that the content of the first string does not include the ending identifier and a comparison indicating that the content of the first string and the content of the second string not being equal, performance of the size comparison on the content of the first string and the content of the second string.

9. The apparatus according to claim 8, wherein the execution circuitry is configured to perform the comparison between the content of the first string and the content of the second string that comprises:
   performance of an XOR operation on the content of the first string and the content of the second string to generate a second result value, and
   determination of whether the content of the first string and the content of the second string are equal according to the second result value.

10. The apparatus according to claim 9, wherein the non-zero first result value indicates that the content of the first string includes the ending identifier, and the non-zero second result value indicates that the content of the first string and the content of the second string are unequal.

11. The apparatus according to claim 10, wherein the execution circuitry is further configured to:
    perform an OR operation on the first result value and the second result value to determine whether the content of the first string does not include the ending identifier and whether the content of the first string and the content of the second string are unequal.

12. The apparatus according to claim 1, wherein the comparison instruction is an assembly code instruction in an extended instruction set of the apparatus.

13. A method for string processing, comprising:
    acquiring a source string;
    comparing the source string with an ending identifier using a comparison instruction, wherein the comparison instruction comprises comparing each byte of the source string with the ending identifier and the comparison instruction is an assembly code instruction;
obtaining a result value corresponding to the source string according to a result of the comparison; and
modifying and setting a flag bit of a zero flag register according to the result of the comparison.

14. The method according to claim 13, further comprising:
obtaining, from a hardware register, an enable flag indicating whether execution of the byte comparison instruction is allowed; and
executing the comparison instruction in response to the enable flag indicating that execution of the comparison instruction is allowed.

15. A computer system, comprising:
a memory; and
a processor communicatively coupled to the memory, and comprising:
a first register configured to store a source string, wherein the source string comprises at least one byte;
an execution circuitry communicatively coupled to the first register and configured to:
acquire the source string from the first register; and
execute a comparison instruction to compare the at least one byte in the source string with an ending identifier to obtain a result value corresponding to the source string, wherein the comparison instruction is executed on each of the at least one byte in the source string and the comparison instruction is an assembly code instruction; and
a zero flag register configured to indicate the result value, wherein the execution circuitry is further configured to modify and set a flag bit of the zero flag register according to the result value.

16. The apparatus according to claim 5, wherein the execution circuitry is communicatively coupled to the first register and is further configured to:
locate the ending identifier based on the result value to shorten an execution time of the string comparison operation.

17. The apparatus of claim 1, wherein the flag bit of the zero flag register is a single bit.

\* \* \* \* \*